June 12, 1962 L. F. SCHMID 3,038,459
INTERNAL COMBUSTION ENGINE
Filed Sept. 26, 1960
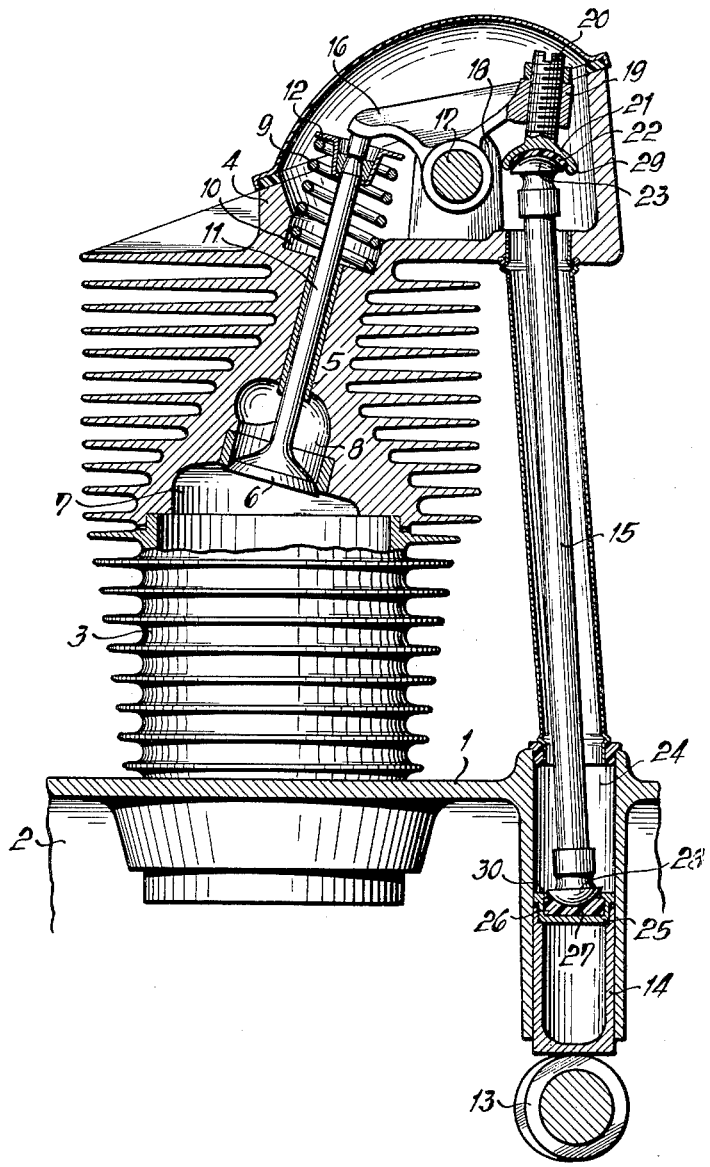
INVENTOR
LEOPOLD FRANZ SCHMID
BY Dicke, Craig & Freudenberg
ATTORNEYS United States Patent Office 3,038,459
Patented June 12, 1962

3,038,459
INTERNAL COMBUSTION ENGINE
Leopold Franz Schmid, Stuttgart, Germany, assignor to Firma Dr. Ing. h.c.F. Porsche KG., Stuttgart-Zuffenhausen, Germany
Filed Sept. 26, 1960, Ser. No. 58,453
Claims priority, application Germany Oct. 29, 1959
2 Claims. (Cl. 123—90)

The present invention relates to a valve-controlled internal combustion engine in which the valves are actuated by cams through the interposition of a linkage.

With valve-controlled systems of the type mentioned hereinabove, tapping noises are normally likely to occur which, as a rule, are more readily audible with air-cooled engines than with water-cooled internal combustion engines. In order to dampen the noises, it has already been proposed in the prior art to install hydraulic tappets in the valve-control arrangement. While the rattling and tapping noises are reduced by such an arrangement, the manufacture of such types of tappets, however, is difficult and relatively expensive.

In contradistinction thereto, it is proposed in accordance with the present invention to realize the connection of the linkage parts by the interposition of low-noise inserts. By the use of such an arrangement as proposed herein, oil lines together with valves necessary with hydraulic tappets and a multitude of seals are obviated thereby. The noise-damping or sound-proofing according to the present invention takes place exclusively by an insert which is accommodated within the bearing of the linkage parts already present, whereby any harsh metallic noise is prevented during the movements of the control linkage. This construction is inexpensive since it consists exclusively of one part compared to the large number of structural parts of which the hydraulic tappets are composed. It is thereby advantageous, in accordance with the present invention, if the bearing of a push rod supported, for example, at a rocker arm and at a tappet takes place by the interposition of a sound-damping insert. The insert forms a bearing dish having a spherically-shaped curved sliding surface or is provided with a bearing dish of such shape. In order to prevent that the insert is displaced during the movements of the control linkage from the intended assembled position thereof, the recesses are provided with angularly bent rim portions which retain the insert in the desired position thereof. It is also achieved by the use of such an arrangement that with a material, for example, synthetic material which has advantageous damping characteristics accompanied, however, by a relatively low rigidity, a lateral displacement or deflection of the insert out of the securing arrangement is prevented.

As a rule, non-metallic materials having a relatively good elasticity possess only a slight rigidity. In order to enable the installation of inserts made of materials having good damping characteristics, the bearing surfaces of the elastic inserts as well as the linkage parts cooperating therewith are constructed, in accordance with the present invention, in such a manner that they offer a relatively large working surface. As a result thereof, the specific surface stress in the insert is reduced so that the life length thereof is increased. On the other hand, there exists the possibility to utilize a material with relatively slight rigidity having, however, advantageous damping characteristics. It has been found advantageous if the push rod is provided at both ends thereof with extensions having mushroom-shaped bearings the radius of curvature of which essentially corresponds to the diameter of the push rod.

Accordingly, it is an object of the present invention to provide a valve control arrangement for internal combustion engines which obviates the disadvantages and shortcomings of the prior art constructions in a simple and effective manner.

It is another object of the present invention to provide a valve control system for internal combustion engines which precludes tapping noises that may occur in the valve-actuating linkage in a relatively simple and inexpensive manner.

A still further object of the present invention resides in the provision of a valve-actuating linkage system which enables the use of inserts made of a material having good damping characteristics notwithstanding the relatively poor rigidity characterstics thereof.

A still further object of the present invention resides in the provision of an actuating system for the valves of an internal combustion engine which permits ready assembly of the parts including sound-absorbing inserts by simple means while preventing undesired displacement of these inserts during operation of the engine.

These and other objects, features and advantages of the present invention will become more obvious from the following description when taken in connection with the accompanying drawing which shows, in the single FIGURE thereof, for purposes of illustration only, a cross-sectional view through an air-cooled internal combustion engine provided with valves arranged in the cylinder head in a suspended manner.

Referring now to the drawing, reference number 1 designates therein the internal combustion engine which includes a crank case 2. One or several cylinders 3 are inserted into the crank case 2 which are closed off by means of the cylinder head 4. A valve 6 which is an overhead valve is supported in the cylinder head 4 within a valve guide 5 which valve 6 closes off the working space 7 or combustion chamber of the internal combustion engine against the gas line 8. The valve is under the effect of a spring 9 which abuts at the cylinder head 4 within a recess 10 and is supported on the other end thereof at a spring disk 12 secured to the valve shaft 11, thereby seeking at all times to displace the valve 6 in the closing direction thereof.

The actuation of the valve 6 takes place by means of a cam 13 through a suitable linkage. The cam 13 is supported, in a manner known per se, within the crank case 2 and is driven in any suitable manner by the internal combustion engine. The linkages consists of a tappet 14 which is operatively connected by means of a push rod 15 with the rocker arm 16 transmitting the movement to the valve 6.

The rocker arm 16 is rotatably supported on a bearing pin 17 which is secured in a bearing lug 18 provided in the cylinder head 4. The end 19 of the rocker arm 16 opposite the valve 6 is provided with a threaded bolt member 20 which terminates in a dish-shaped bearing portion 21. The dish-shaped bearing portion 21 is curved in a spherically-shaped manner and serves for the accommodation of a bearing dish 22 which is shaped correspondingly and is made of non-metallic material, for example, of synthetic material of any suitable commercially available material, such as any suitable plastic material having the desired characteristics. A mushroom-shaped bearing extension 23 forming part of the push rod 15 is supported thereby within the bearing dish 22.

The dish-shaped bearing portion 21 together with the dish-shaped bearing insert 22 and the mushroom-shaped bearing portion 23 of the push rod 15 are thereby constructed in such a manner that as large as possible a working surface is present between afore-mentioned parts. In the described embodiment, the radius of the spherically-shaped bearing dish 22 corresponds essentially to the diameter of the push rod 15 so that a relatively small specific surface load or stress of the bearing dish 22 is achieved. The mushroom-shaped bearing portion 23 is thereby made of light metal in order to reduce the inertia forces.

A similar connection is provided between the push rod 15 and the tappet 14. The tappet 14 which slides within a bore 24 in the crank case 2 is provided with a cylindrical body member 25 open on one side thereof which serves for the accommodation of an insert of synthetic material, for example, of a material commerically sold under the name of Vulkollan though any other suitable commercially available material having the desired characteristics may be substituted therefor. The insert 26 has a spherically-shaped bearing surface 27 into which engages or in which is supported the mushroom-shaped bearing portion 28 of the push rod 15.

For purposes of retaining the dish-shaped inserts 22 and 26 in the assembled positions thereof, both the dish-shaped portion 21 of the threaded bolt member 20 and the body member 25 of the tappet 14 are provided with rim portions 29 and 30, respectively, which are angularly bent over or toward the damping inserts 22 and 26 and thereby retain the same in the assembled position in a simple manner. A lateral displacement or squeezing out of the insert during operation is also precluded thereby.

During the movements of the actuating linkage, the non-metallic inserts which are made of a material having good sound-damping characteristics, preclude load noises, whereby the engine noise is considerably reduced.

While I have shown and described one embodiment in accordance with the present invention, it is understood that the same is not limited thereto, but is susceptible of many changes and modifications within the spirit and scope of the present invention. For example, changes may be made in the construction thereof, and/or differently constructed parts of the control actuating system may be provided to which the arrangement according to the present invention may be readily applied and/or in which an arrangement according to the present invention may be readily installed.

Thus, it is quite obvious that the present invention is not limited to the details shown and described herein, but is susceptible of many changes and modifications and I, therefore, do not wish to be limited to the details shown and described herein, but intend to cover all such changes and modifications as are encompassed by the scope of the appended claims.

I claim:

1. In a valve-controlled internal combustion engine having combustion chamber means, valve means for said combustion chamber means, cam means, and linkage means operatively connecting said cam means with said valve means to actuate the latter by the former, said linkage means having a plurality of linkage members including a tappet, a rocker-arm and a push-rod having operative connections with said tappet and with said rocker-arm; sound-damping insert means interposed in the operative connection between said push-rod and said tappet and in the operative connection between the push-rod and said rocker-arm, said insert means interposed in said operative connection between said push-rod and said tappet being of a construction different from said insert means interposed in said operative connection between said push-rod and said rocker-arm, all of said insert means being elastic, the bearing surfaces of all of said insert means and of the linkage members cooperating therewith being sperically-shaped sliding surfaces so constructed as to produce relatively large working surfaces, said bearing surfaces of all of said insert means being concave, the radius of curvature of said spherically-shaped sliding surfaces being approximately equal to the diameter of said push-rod.

2. In a valve-controlled internal combustion engine having valve means and mechanism to actuate said valve means comprising cam means and linkage means including a tappet, a rocker-arm and a push-rod for connecting said cam means will said valve means to actuate the latter by the former; said push-rod being in operative and sound-deadening engagement at one end thereof with said rocker-arm and at the other end thereof with said tappet, said one end of said push-rod comprising a mushroom-shaped bearing extension having a diameter greater than that of said push-rod, said rocker-arm being provided with a dish-shaped bearing member having a spherically-curved concave surface, a spherically-shaped bearing dish member having a convex surface engaging said concave surface and further having a concave surface engaging said bearing extension of said push-rod, said dish-shaped member comprising retaining means for said bearing dish member, said other end of said push-rod terminating in a further mushroom-shaped bearing extension of the same diameter as said first-named bearing extension, said tappet being provided with a cylindrical body member having a closed bottom portion and an opening opposite said closed bottom portion, a plastic insert member supported on said bottom portion, said plastic insert member having a spherically-shaped bearing surface of a radius of curvature substantially equal to the diameter of said push-rod, said bearing surface engaging said further mushroom-shaped bearing extension, said cylindrical body member having means for retaining said plastic insert member in said cylindrical body member.

References Cited in the file of this patent

UNITED STATES PATENTS

| | | |
|---|---|---|
| 1,377,523 | Payne | May 10, 1921 |
| 1,449,973 | Coyle | Mar. 27, 1923 |
| 1,548,401 | Wood | Aug. 4, 1925 |
| 1,588,078 | Windsor | June 8, 1926 |
| 2,885,248 | White | May 5, 1959 |